INVENTORS
JESSE T. CHERRY JR. &
KENNETH H. WATERS
BY
*William J. Miller*
ATTORNEY Nov. 22, 1966  J. T. CHERRY, JR., ET AL  3,286,783
METHOD AND APPARATUS FOR INDUCING SEISMIC SHEAR
WAVES IN THE EARTH AND FOR SEISMIC SURVEYING
Filed Nov. 14, 1962  2 Sheets-Sheet 2

INVENTORS
JESSE T. CHERRY JR. &
KENNETH H. WATERS
BY William J. Wille
ATTORNEY

United States Patent Office 3,286,783
Patented Nov. 22, 1966

3,286,783
METHOD AND APPARATUS FOR INDUCING SEISMIC SHEAR WAVES IN THE EARTH AND FOR SEISMIC SURVEYING
Jesse T. Cherry, Jr., and Kenneth H. Waters, Ponca City, Okla., assignors to Continental Oil Company, Ponca City, Okla., a corporation of Delaware
Filed Nov. 14, 1962, Ser. No. 237,661
7 Claims. (Cl. 181—.5)

The present invention relates generally to the art of inducing waves in an elastic body and more particularly, but not by way of limitation, relates to method and apparatus for inducing shear waves in the earth for seismic surveying.

There are two general types of wave signals which will propagate through the earth as the result of a physical disturbance at the surface in such a manner as to be reflected from subterranean interfaces and thereby be useable for seismographic surveying. One is the so-called pressure wave which is also sometimes referred to as compression or longitudinal wave because the earth particle motion is in the direction of wave propagation. The other is the shear wave, so-called because it results from particle motion generally normal to the direction of wave propagation. In addition, when the shear wave particle motion is oriented normal to the incidence plane, which is defined as a vertical plane passing through both the surface point of origin and surface point of detection of the waves, the waves may be defined as horizontal shear (SH) waves, and when the particle motion is oriented within the incidence plane, the waves are defined as vertical shear (SV) waves. Heretofore, virtually all seismographic surveys have been compiled by the use of pressure waves, which in early seismographic work were generated by explosive charges. However, in more recent times the pressure waves have been generated by various kinds of mechanical vibrators or transducers which are capable of inducing a pressure wave signal in the earth having a controlled frequency content.

Although the seismic surveys made by using explosively generated pressure waves have heretofore proven highly valuable to the petroleum producing industry in locating subterranean oil reservoirs, seismic surveys made by using pressure waves having a controlled frequency content, as taught in U.S. Patent No. 2,688,124, issued to William E. N. Doty et al. on August 31, 1954, have provided a means whereby the subterranean interfaces may be located with greater precision. The pressure waves generated in this type of seismographic system customarily are in the frequency range between 15–90 c.p.s. The earth has a tendency to attenuate the higher frequency signals such that only the lower portion of the frequency signal penetrates to the greater depths. Although the low frequency signals produce very valuable data, the thickness of beds which can be detected by the pressure waves are limited by the wave length of the waves, and the lower frequencies of course have longer wave lengths than the higher frequencies. Also, the pressure waves are converted partially into shear waves upon striking a horizontal interface. This phenomenon is particularly pronounced at the first, or uppermost, hard layer of rock such that a relatively large amount of noise in the form of both shear wave components and pressure wave components is trapped in the weathered or surface layer of the earth. The conversion of the pressure waves to shear wave components and the resulting noise or interference generated in the weathered layer results in a somewhat complicated seismogram which in some instances is difficult to read, even after utilizing the more advanced techniques of compositing and correlating the multifrequency signals to increase the signal to noise ratio.

Shear waves, on the other hand, travel through the earth at approximately one-half the speed of pressure waves so that for a given frequency the shear waves have a wave length approximately one-half as long as the pressure waves. Thus for a given frequency, the resolution for shear waves is substantially better than the resolution for pressure waves and thinner reflective beds in the earth can be detected. Since shear waves can be horizontally polarized, horizontally polarized SH shear waves are not converted into different wave types upon reflection from horizontal interfaces as is the case with pressure waves. Therefore, seismograms made from SH shear wave energy are somewhat simpler to interpret. This is particularly true insofar as the reduction of noise trapped in the surface or weathered layer of soil is concerned.

Shear waves are also highly useful, due to the fact that the ratio between the velocity of pressure waves and the velocity of shear waves, although being approximately two, will vary in accordance with Poisson's ratio such that valuable deductions can be made from comparing the seismogram which is a record of pressure wave reflections with the seismogram which is a record of shear wave reflections recorded at the same locality.

The existence of shear waves in general has been known for many years. Attempts have been made to generate shear waves by anchoring one member to the earth and striking the anchored member a horizontal blow with another member. One shear wave generator of this general type utilized a horizontally disposed tube and stop member which are interconnected and anchored to the ground. An explosive charge propels a projectile through the tube against the stop member, causing a reaction force against the tube and then against the stop member. Another type utilized a swinging weight to strike the anchored member. Mere explosive charges sometimes generate shear waves as well as pressure waves when the explosion is not uniformly contained and unequal forces are developed. However, this cannot be depended upon and varies radically from shot to shot so as to be completely unuseable for seismic purposes. The other types of mechanical means for generating shear waves have proven extremely expensive in that each generation site had to be specially prepared and, further, were incapable of generating sufficient shear wave energy for seismic surveying purposes. Therefore, workers in the art have heretofore generally been resigned to the fact that shear waves were unsuitable for seismographic exploration.

Accordingly, an important object of the present invention is to provide method and apparatus for generating seismic shear waves of sufficient magnitude as to be useable in seismographic exploration work and which at the same time have, if desired, a controlled frequency content such that the signal can be amplified relative to random noise and relative to interference by patterns of seismometers and sources. Broadly stated, the method is comprised of coupling a member to the earth and oscillating the member in a horizontal plane a plurality of times at a predetermined, controlled frequency. The present invention also contemplates methods of inducing seismic shear waves by the reciprocation of the coupling member in a linear, horizontal direction, and also by rotatably oscillating the coupling member about a vertical axis so as to produce highly directional torsional shear waves down the vertical axis as well as horizontally radiating shear waves. Due to the unique propagation pattern of the shear waves generated in these methods, the present invention further contemplates a novel method of seismographic surveying utilizing the waves generated by one of the methods to cancel the surface interference waves created by the other of the wave generation methods. The novel apparatus constructed in accordance with the present invention comprises, generally, an earth coupling member for engaging the earth, a reaction mass member, and a motor interconnecting the two members for oscillating the mass member relative to the coupling member in a horizontal plane. In one embodiment, the coupling member is reciprocated linearly in a horizontal direction and in another embodiment is oscillated about a vertical axis.

Therefore, an important object of the present invention is to provide a method for inducing seismic shear waves in the earth at a sufficient energy level as to be useable for seismographic surveying.

Another object of the present invention is to provide a method for inducing seismic shear waves in the earth at a predetermined, controlled frequency so as to permit subsequent amplification of the seismic signal relative to noise by correlating techniques.

Another object of the present invention is to provide a seismic signal which will have a shorter wave length for a given frequency and which will thereby be more sensitive to thin subterranean beds.

Another object of the present invention is to provide a method for generating seismic shear waves which are radiated primarily in a horizontal plane and are thereby limited to the upper layers of the earth.

Still another object of the present invention is the provide a seismic signal having reduced interference as a result of component signals being trapped in the upper layers of the earth.

Another object of the present invention is to provide an apparatus for generating seismic shear waves of sufficient intensity and controlled frequency content as to be used for seismographic surveying.

Yet another object of the present invention is to provide a device for generating highly directional torsional shear waves oriented about a vertical axis.

Still another object of the present invention is the provision of a transducer of the type described which is very compact, relatively easy to transport, and can be quickly and easily coupled to the earth.

Many additional objects and advantages of the present invention will be evident to those skilled in the art from the following detailed description and drawings, wherein.

Figure 1:
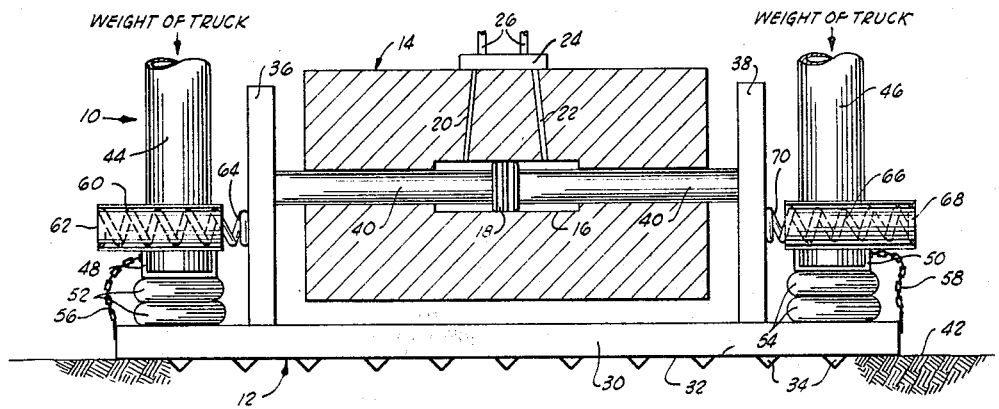
FIG. 1 is a somewhat schematic, side elevational view, partially in section, of a transducer constructed in accordance with the present invention.

Referring now to the drawings, and more particularly to FIG. 1, a seismic transducer constructed in accordance with the present invention is indicated generally by the reference numeral 10. The transducer 10 is comprised of a coupling member, indicated generally by the reference numeral 12, and a reaction mass member, indicated generally by the reference numeral 14. The coupling member 12 and the reaction mass member 14 may be considered as interconnected by a hydraulic linear actuator comprised of a cylinder bore 16 formed in the mass member 14 and a piston member 18 which is reciprocally disposed within the cylinder bore 16. The reaction mass member 14 preferably comprises a large block of metal having a central bore extending therethrough in which a plurality of liners and insert members are disposed to form the cylinder bore 16. In such a case, a pair of ports 20 and 22 extend through the reaction mass member 14 and communicate with the cylinder bore 16 on opposite sides of the piston member 18. An electromagnetically operated four-way valve 24 then controls passage of hydraulic fluid to the cylinder bore 16 to reciprocate the piston member 18 relative to the reaction mass member 14. Hydraulic fluid is fed from a suitable source through flexible conduits 26 in a conventional manner.

The coupling member 12 is comprised primarily of a base plate 30 which preferably has a substantially flat bottom 32 onto which a plurality of projections 34 are connected for penetrating the earth. A pair of upright plates 36 and 38 are connected to the base plate 30 and to the opposite ends of the piston rod 40 of the piston member 18. Thus it will be noted that the reaction mass member 14 is supported only by the uprights 36 and 38 and the piston rod 40, the mass member being free to slide relative to the piston rod. The base plate 30 is held firmly against the surface 42 of the earth by weight from a transporting truck which may be applied through vertically disposed tubular posts 44 and 46, which may be in turn be connected to a hydraulic lift apparatus such as described in detail in U.S. Patent No. 3,024,861. A pair of horizontally disposed channels 48 and 50 are connected to the bottoms of the upright posts 44 and 46, respectively. Two or more flexible pillow bags 52 which are filled with air under pressure are disposed between the channel 48 and the base plate 30. Two or more similar air filled flexible pillow bags 54 are disposed between the channel 50 and the other end of the base plate 30. Two or more chains 56 (only one of which is shown) interconnect the channel 48 and one end of the base plate 30, while a similar pair of chains 58 (only one of which is shown) interconnect the channel 50 and the other end of the base plate 30. The chains 56 and 58 are of such a length as to be loose when at least a portion of the weight of the truck is placed on the members 44 and 46 to compress the air in the flexible pillow bags 52 and 54, but are sufficient to lift the coupling member 12 and reaction mass member 14 for transport, as hereafter described.

A pair of tubular members 60 (only one of which is illustrated) are connected to the channel 48 on either side of the vertical post 44. The extreme ends of the tubular members are closed by plates 62 (only one illustrated). An isolation spring 64 (only one illustrated) is disposed in each of the tubes 60 and act between the end plates 62 and the upright member 36 of the coupling member 12. A similar pair of tubular members 66 (only one illustrated) are connected to the channel 50 and disposed on either side of the vertical post 46 and have the extreme ends thereof closed by plates 68 (only one illustrated). An isolation spring 70 (only one illustrated) is disposed in each of these tubular members 66 and act between the end plates 68 and the upright member 38 of the coupling member 12.

In operation, the transducer 10 is normally transported by a truck (not shown) having hydraulically actuated lift means connected to the vertically disposed posts 44 and 46 for raising and lowering the transducer. When the posts 44 and 46 are raised upwardly, the chains 56 and 58 become taut and lift the entire transducer 10, including the earth coupling member 12 and the reaction mass member 14, such that the transducer rides suspended from the posts 44 and 46. When it is desired to induce a seismic signal in the earth, the posts 44 and 46 are lowered until the base plate 30 contacts the surface of the earth. The hydraulically actuated lift for the vertical posts 44 and 46 is then lowered further until the truck is lifted and a substantial portion of the weight of the truck is transmitted through the air filled bags 52 and 54 to the base plate 30. The projections 34 are then pressed into the surface 42 of the earth and the base plate 30 is securely coupled to the earth.

Upon application of a controlled electrical signal to the servo valve 24, hydraulic power fluid will be introduced to the cylinder bore 16 through the port 20, for example, and hydraulic fluid will be exhausted from the cylinder bore 16 through the port 22. The high pressure power fluid will then drive the piston member 18 and therefore the entire coupling member 12 to the right relative to the reaction mass when referring to FIG. 1. Since the reaction mass member 14 is free to move in a horizontal direction by reason of being only slidingly connected to the piston member 18, the reaction mass member 14 will have a tendency to be displaced to the left. However, an equal force will be exerted on the relatively high mass of the reaction mass member 14 such that the primary motion of the transducer 10 relative to the earth will be the displacement of the coupling member 12. Since the coupling member 12 is securely connected to the earth, the earth particles will be given a horizontal velocity.

As the controlled signal changes polarity, the servo valve 24 is thrown in such a manner as to introduce high pressure power fluid through the port 22 to the cylinder bore 16, and fluid in the cylinder bore 16 will then be exhausted through the port 20. The piston member 18 will then be driven in the opposite direction, i.e., to the left when referring to FIG. 1, and the coupling member 12 will be moved in the same direction as a result of the inertia force of the reaction mass member 14. Therefore, as the controlled signal periodically switches the servo valve 24, the coupling member 12 will be made to reciprocate, and a horizontal particle motion will be imparted to the surface 42 of the earth which will propagate as SH shear waves primarily in a plane normal to the piston rod 40. As the SH shear waves propagate, the earth particle motion will be generally normal to the propagation plane and therefore generally parallel to the piston rod 40 which is the axis of propagation. Also, SV shear waves will be propagated in a vertical plane extending through the axis of reciprocation.

It will be appreciated that the vertical posts 44 and 46, as well as the channels 48 and 50 and tubular members 60 and 66, are attached to the transporting truck and are not free to move horizontally. Further, the coupling member 12 should be permitted free movement and yet be pressed firmly against the earth. Also, the uprights 36 and 38 should be centered between the vertical posts 44 and 46 and the reciprocation of the coupling member 12 isolated from the posts 44 and 46 to prevent damage to the truck. Therefore, it will be noted that the flexible pillow bags 52 and 54, which are filled with air under pressure, will transmit a vertically downward force on the ends of the base plate 30, and yet will permit free movement of the base plate 30 in the horizontal direction. The isolation springs 64 and 70 provide a means for assuring that the transducer 10 will be continually centered between the vertical posts 44 and 46, while at the same time isolating the vibrations from the truck. Due to the construction of the tubular members 60 and 66, the springs 64 and 70 can be selected of sufficient length as to have a natural resonant frequency below the operating frequency at which the transducer 10 will be operated, such that during normal operation the springs will not exert an appreciable force on the coupling member 12. Also, it will be noted that the force of the springs 64 and 70 are in opposition so that in the absence of resonance, the net force applied to the coupling member 12 is relatively slight so long as the average position of the coupling member 12 is centered between the upright posts 44 and 46.

Figure 2:
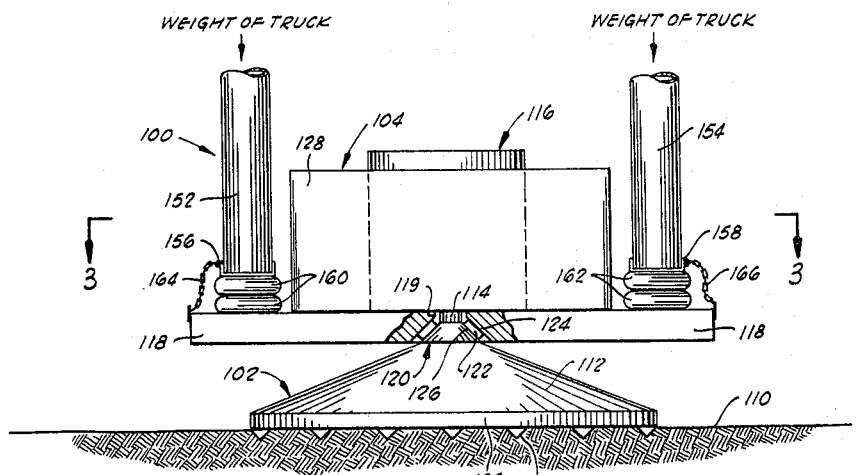
FIG. 2 is a side elevational view, partially in section, of another transducer constructed in accordance with the present invention.

Referring now to FIG. 2, another transducer constructed in accordance with the present invention is indicated generally by the reference numeral 100 and comprises an earth coupling member 102 and a reaction mass member 104. The coupling member 102 is comprised generally of a circular plate 106 having a plurality of spaced projections 108 on the bottom face thereof for penetrating the surface 110 of the earth to thereby insure positive coupling. The coupling member 102 includes an inverted conical portion 112 for reinforcing the circular plate 106. The conical portion 112 is connected to the oscillatory drive shaft 114 of a rotary oscillating motor 116, as hereafter described in greater detail.

Figure 3:
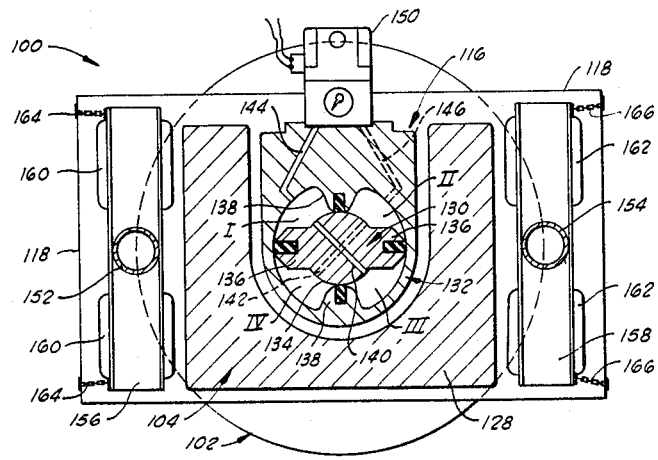
FIG. 3 is a sectional view taken substantially on lines 3—3 of FIG. 2, showing various fluid ports in dotted outline.

The reaction mass member 104 is comprised of a base plate 118 having a centrally disposed aperture 119 for passing the shaft 114. A suitable thrust bearing, indicated generally by the reference numeral 120, is provided between the base plate 118 and the coupling member 102, and may conveniently comprise a conventional roller type bearing 122 which travels on a conical bearing race 124 on the base plate 118 and on the conical bearing race 126 formed on the coupling member 102. The reaction mass member 104 also includes a U-shaped weight 128 having an outline as best seen in FIG. 3 which is connected to the base plate 118 by any suitable means.

The reaction mass member 104 and the coupling member 102 may be considered as interconnected by the oscillating motor 116 which may comprise any suitable type of motor for oscillating the coupling member 102 about the vertically disposed drive shaft 114 and relative to the reaction mass member 104. The motor 116 preferably comprises a blade piston 130 which is disposed in a cylinder 132, the cross sectional outline of which is illustrated in FIG. 3. The blade piston 130 has a circular center portion 134 and oppositely extending wiper blades 136 which have suitable packing means for engaging and forming a sliding seal with the circular walls of the cylinder 132. The cylinder 132 has opposite, inwardly directed projections 138 which also have packing means for engaging and forming a sliding seal with the circular center portion 134 of the blade piston 130. Thus it will be noted that the cylinder 132 is divided into four distinct expansible fluid chambers designated by the reference characters I, II, III and IV. Chamber I is in fluid communication with chamber III through a fluid passageway 140 extending through the center portion 134. Similarly, chamber II is in fluid communication with chamber IV through a fluid passageway 142 extending through the center portion 134. A fluid port 144 extends through the cylinder 132 and communicates with chamber I and therefore chamber III through the passageway 140. Another fluid port 146 extends through the cylinder 132 and is in fluid communication with chamber II and therefore chamber IV through the passageway 142. An electrically controlled four-way servo valve 150 is connected to control passage of power fluid alternately through the ports 144 and 146 while connecting the other to exhaust.

As in the case of transducer 10, transducer 100 is preferably transported and also pressed against the surface 110 of the earth by a truck having a pair of vertically movable upright posts 152 and 154. A pair of channels 156 and 158 are connected to the lower ends of the posts 152 and 154, respectively. The weight of the truck may be transmitted to the base plate 118 through the posts 152 and 154 and air filled, flexible pillow bags 160 and 162, respectively. A pair of loosely strung chains 164 interconnect the channel 156 and one end of the base plate 118, while a similar pair of loosely strung chains 166 interconnect the channel 158 and the other end of the base plate 118. The chains 164 and 166 are loosely strung so that when a portion of the weight of the truck is pressed against the pillow bags 160 and 162, the chains will be loose and will not interfere with operation of the transducer, as hereafter described. However, when the posts 152 and 154 are raised, the chains 164 and 166 will lift the entire transducer 100 for transport.

In operation, the transporting truck is merely driven to the point at which it is desired to generate seismic shear waves. The hydraulic lift mechanism is then actuated to lower the upright posts 152 and 154 until the plate 106 of the coupling member 102 engages the surface 110 of the earth. The posts 152 and 154 are lowered further until a substantial portion of the weight of the truck is placed on the transducer 100 through the upright posts 152 and 154, the inflated pillow bags 160 and 162, the base plate 118, and through the thrust bearing 120 to the earth coupling member 102. Of course the truck also preferably transports a source of high pressure fluid for operating the motor 116, as well as electrical equipment for energizing the servo valve 150 in the proper sequence. Assume first that upon actuation of the servo valve 150 by an electrical signal, the valve is switched in such a manner as to introduce high pressure power fluid through the port 144 and exhaust fluid through the port 146. The high pressure fluid passing through the port 144 will enter chamber I and pass through the passageway 140 into chamber III. Fluid will be exhausted from chamber IV through passageway 142 into chamber II, and then out through port 146. Accordingly, a high pressure will be exerted on the wiper blades 136 in such a manner as to rotate the blade piston 130 counterclockwise when referring to FIG. 3. At the same time, a similar force will be exerted on the inwardly directed projections 138 of the cylinder 132, tending to rotate the cylinder 132 and the remainder of the reaction mass structure, including the weight 128 and base plate 118, in a clockwise direction when referring to FIG. 3. Since the reaction mass member 104 is substantially heavier than the coupling member 102, a high couterclockwise torque centered along the axis of the drive shaft 114 will be exerted on the surface 110 of the earth to which the member 102 is coupled.

Upon shifting of the valve 150 in such a manner to introduce power fluid through the port 146, high pressure power fluid will be introduced to chamber II and also to chamber IV through passageway 142. Fluid will be exhausted from chamber III through the passageway 140 and from chamber I through port 144. The high pressure power fluid will then tend to rotate the blade piston 130 clockwise and the cylinder 132 counterclockwise, still referring to FIG. 3. The heavy mass of the reaction mass member 104 will resist movement to a high degree such that the lighter coupling member 102 will rotate and exert a torsional force on the surface 110 of the earth about a vertical axis corresponding to the drive shaft 114. As the power fluid is switched back and forth between port 144 and port 146, preferably at a predetermined frequency in the range from 0–120 c.p.s., the coupling member 102 will be oscillated about the vertical axis of the drive shaft 114. As the coupling member 102 is oscillated, a torsional shear wave will be propagated downwardly along the axis of oscillation, and shear waves will be propagated from the periphery of the circular plate 106 in a 360° pattern, as hereafter described in greater detail.

As previously mentioned, an important aspect of the present invention is the provision of a method for generating a continuous seismic shear wave signal suitable for seismographic surveying of subterranean strata. The method includes, broadly, the coupling of a member to the surface of the earth and the continuous oscillation of the member in a plane parallel to the surface of the earth, which in nearly all cases will be a horizontal plane. Also the member is preferably oscillated at a predetermined frequency, and the frequency is preferably varied in a certain predetermined pattern such as from 90 c.p.s. down to 15 c.p.s. at a uniform rate.

Figures 4, 5:
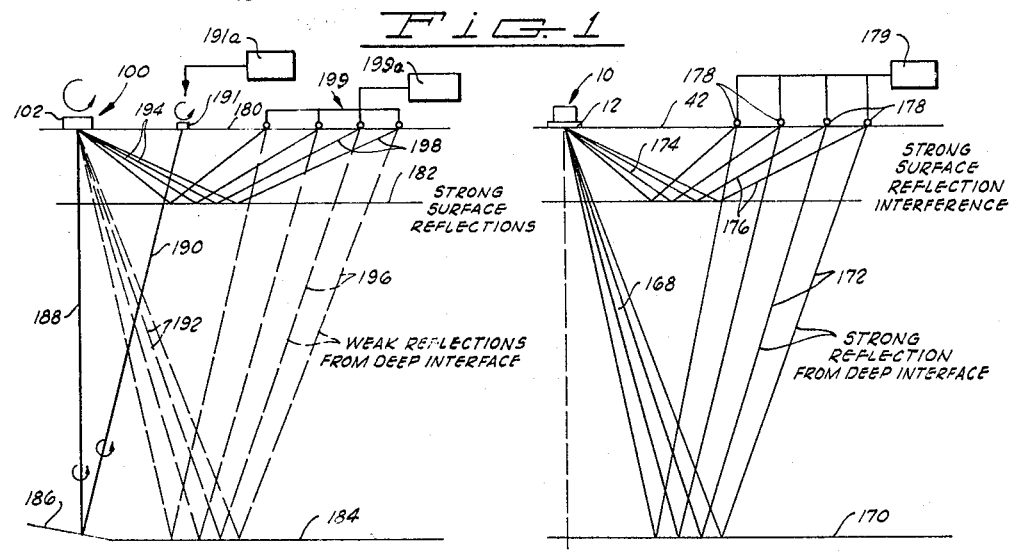
FIG. 4 is a schematic representation of the radiation pattern of seismic shear waves generated by the transducer of FIG. 1 and serves to illustrate the method in accordance with the present invention.
FIG. 5 is a schematic representation of the radiation pattern of the seismic shear waves generated by the transducer of FIG. 2 and serves to illustrate another method in accordance with the present invention; and, FIG. 6 is a schematic illustration of another novel method of seismographic surveying in accordance with the present invention.

Two more specific methods of generating seismic shear waves are illustrated schematically in FIG. 4 wherein a coupling member, such as the coupling member 12 of the transducer 10, is coupled to a surface 42 of the earth. Upon reciprocation of the coupling member 12 in the manner described above with regard to the operation of the transducer 10, continuous oscillatory particle motion will be established in a horizontal direction. Then, depending upon the orientation of the axis of reciprocation of the transducer 10 relative to a nest of geophones 178, either SH or SV waves will be propagated generally in a vertical plane, represented by the plane of the drawing paper, which will be reflected to the nest of geophones 178 and recorded by a suitable recording means 179. If the axis of reciprocation of the transducer is disposed in line with the nest of geophones 178, SV shear waves will be propagated. The geophones 178 should also be oriented along the same line so as to detect the SV shear waves. The SV shear waves propagated downwardly will be reflected from the subsurface interfaces and when detected and recorded will provide a source of valuable information.

If, on the other hand, the axis of reciprocation is oriented at right angles to the line extending between the transducer and the nest of geophones 178, SH shear waves will be generated and accordingly the geophones should be so oriented as to measure horizontal particle motion at right angles to the line between the transducer and the nest of geophones. The horizontally oriented SH shear waves will then propagate in all directions from the coupling member 12, but will have the strongest components in a plane passing through the coupling member 12 normal to the direction of linear oscillation. The shear waves propagating in the near-vertical direction along the lines 168 will be reflected upwardly by interfaces between lower strata, designated by the reference numeral 170, as strong shear wave reflections traveling along the lines 172. The waves propagated in the near-horizontal direction along the lines 174 will be as strong as the near-vertical waves and will probably be reflected several times in the weathered surface layer to create noise known in the art as surface interference and represented by the lines 176. Therefore, upon recordation of the reflected waves 172 and 176 by a nest of geophones 178 oriented in a horizontal direction parallel to reciprocation of the coupling member 12, a seismogram will be produced having considerable noise and surface interference, but at the same time having sufficiently strong reflections from the deep interfaces as to be highly valuable.

In addition to providing a method for generating shear waves having sufficient energy levels as to be reflected from deeper interfaces, the shear wave seismic signal may easily have a controlled frequency content so that the recorded signal reflections may be correlated in accordance with known techniques to substantially increase the signal level without a corresponding increase in the noise level. The shear waves travel through the earth at approximately one-half the speed of pressure-type waves. Accordingly, the wave lengths of the shear-type waves are approximately one-half the wave lengths of pressure-type waves which for a given frequency will increase resolution approximately two fold, such that reflecting interfaces which are closer together can be distinguished. Although the velocity of the seismic shear waves through the earth is considered to be approximately twice the velocity of pressure waves, the ratio between the velocity of shear waves and the velocity of pressure waves will vary for different types of subterranean formations in direct relation of the value of Poisson's ratio for the particular rock of the formation. Therefore, by comparing the data obtained from the seismic shear waves with data recorded at the same localities using pressure waves of the same frequency content, very valuable data can be obtained as to the type of rock, i.e., limestone, shale, etc., at each depth.

Another more specific application of the method of the present invention is illustrated schematically in FIG. 5, which depicts a vertical section through the earth having a surface 180, a shallow or surface interface 182, and a deep interface 184 having a sloping portion 186. A member, such as the coupling member 102 of the transducer 100, is coupled to the surface 180 and oscillated about a vertical axis in the manner described in connection with the transducer 100. The member 102 is preferably oscillated for a period of several seconds at a predetermined and controlled frequency rate, preferably within the audio frequency range of 0–120 c.p.s., and usually from 90 c.p.s. down to 15 c.p.s. Upon oscillation of the member 102 about the vertical axis, a highly directional torsional shear wave will be propagated vertically downwardly along the axis of oscillation 188 of the coupling member 102. Upon striking the dipping interface 186, the torsional wave will be reflected generally along a line 190 and may be recorded at the surface 180 by a torsional geophone 191 and recording means 191a. Thus it will be appreciated by those skilled in the art that the highly directional torsional shear wave along the axis 188 may be utilized to determine the depth of interfaces directly below the coupling member 102 and by placing a series of torsional sensing geophones 191 in a circular pattern around the coupling member 102, the direction of dip of the bed 186 may be determined.

Also, as the member 102 is oscillated about a vertical axis, shear waves will be propagated in all horizontal directions due to movement of the periphery of the circular coupling member 102. However, since diametrically opposite points of the periphery of the oscillating coupling member 102 are moving in opposite linear directions at any instant, the shear waves generated by opposite peripheral points will tend to cancel each other out as the waves approach the vertical axis of oscillation 188 and produce a cone of relatively weak waves. Accordingly, the near-vertical waves traveling along lines 192 will be relatively weak, while the more horizontally propagating waves traveling along lines 194 will be appreciably stronger, and the shear wave reflections 196 from the deep interfaces will be correspondingly weak, while the reflections 198 from the shallower interfaces 182 will be correspondingly strong and will be detected and recorded by the geophones 199 and recording means 199a. The strong surface shear waves may then be utilized to obtain valuable data about the weathered surface layers, as well as for canceling surface interference, as hereafter described.

Figure 6:
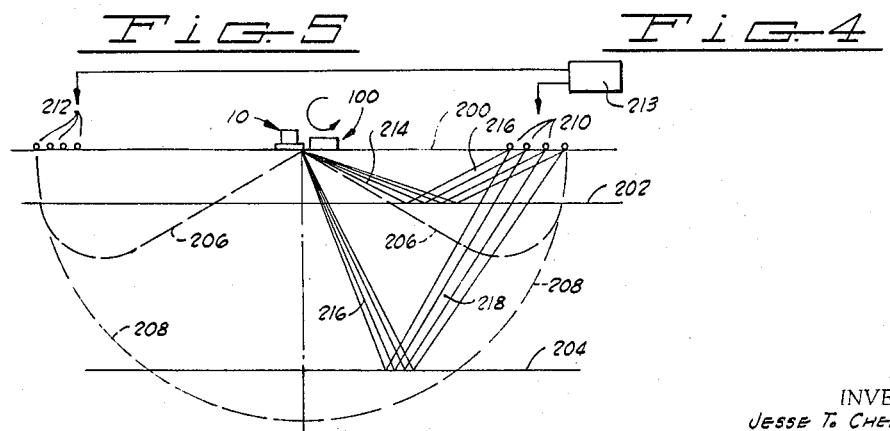

Still another aspect of the present invention is schematically illustrated in FIG. 6 which is a vertical section through the earth having a surface line 200, a shallow interface 202, and a deep interface 204. The method as illustrated in FIG. 6 comprises generally the combination of the more specific methods disclosed in FIG. 4 and FIG. 5 so as to cancel surface reflections and thereby eliminate the interference normally generated in the weathered and other near-surface layers. As previously mentioned, a coupling member 102 oscillated about a vertical axis will generate relatively weak near-vertical shear waves 192 and relatively strong shear waves propagating horizontally near the surface. Thus it will be noted that the relatively strong wave propagation from the oscillated coupling member 102 can be represented in FIG. 6 by the envelope described by dotted line 206. Since all waves generated by a linearly reciprocated coupling member such as 12 are relatively strong, the envelope of strong shear wave propagation from the transducer 10 is represented by the dotted line 208 in FIG. 6. Therefore, it will be evident that the general area of FIG. 6 which is common to both the envelopes 206 and 208 is in the vicinity of the surface layers in which the surface reflection interference causes considerable noise and complicates reading of seismograms.

Accordingly, the present invention contemplates the operation of both a linear-type shear wave generator, such as the transducer 10, and a torsional-type shear wave generator, such as the transducer 100, at a common point and the recordation of the transmitted signals by a common nest of horizontally oriented geophones 210 or 212 and a suitable recording means 213. The transducers 10 and 100 may be sequentially operated at the same frequency to produce identical signals, electronically oriented 180° out-of-phase, and then the recorded seismograms added together. Then the signals generated by the torsional transducer 100 will tend to cancel the near-surface shear waves generated by the linear transducer 10 so as to eliminate an appreciable portion of the noise caused by near-surface reflections.

If desired, instead of operating the transducers 10 and 100 sequentially and then electronically correlating the two recorded seismograms, the transducers 10 and 100 may be physically located as near as possible, somewhat as illustrated in FIG. 6, and operated simultaneously. However, the torsional transducer 100 would be operated 180° out-of-phase with the transducer 10 so that the transmitted shear waves in the envelope 206 would tend to be physically canceled. It will be noted, however, that one-half of the wave propagation from the torsional transducer 100 would necessarily be in-phase with the linear transducer 10 such that cancellation in the direction of one set of geophones 212, for example, would be multiplied rather than canceled. However, in the direction of the geophones 210, the shear waves would be 180° out-of-phase and accordingly the waves 214 would tend to be extremely weak as a result of cancellation, and the reflected waves 216 would be correspondingly weak such that relatively little noise would be recorded by the geophones 210. On the other hand, since the near-vertical waves generated by the linear transducer 10 are substantially stronger than the relatively weak near-vertical shear waves 192 generated by the torsional transducer 100, the net near-vertical shear waves generated by the combined action of the two transducers would be relatively strong, and relatively strong reflections 218 would be recorded by the geophones 210 to provide the desired reflection time data necessary for seismic surveys.

From the above detailed descriptions of preferred embodiments of the present invention, it will be evident to those skilled in the art that a novel method has been described by which seismic shear waves of relatively high magnitude may be induced in the earth or other elastic body. Further, the frequency of the seismic shear waves may be accurately controlled over a desired range so that the signal to noise ratio of the recorded signal can be increased by conventional correlation techniques. A novel method has also been described for generating a torsional, highly directional shear wave signal which propagates substantially along a vertical axis. The same method also generates shear waves which propagate primarily in a horizontal direction and are largely confined to the surface layers thereby providing useful data on these layers. Further, the horizontally propagated shear waves may be utilized to cancel, physically or electronically, a substantial portion of the surface interference or noise normally recorded on seismograms. A pair of novel transducers have also been described by which the various shear waves can be generated in accordance with the methods of the present invention. The transducers are compact and easily transportable, may be easily coupled to the surface of the earth at almost any point, and are capable of generating shear waves of sufficient intensity as to be used for seismographic purposes.

Having thus described several preferred embodiments of the present invention, it is to be understood that various changes, substitutions and alterations can be made therein without departing from the spirit and scope of the present invention as defined by the appended claims.

What is claimed is:
1. A method for inducing seismic shear waves in the earth comprised of the steps of:
   coupling a member to the earth; and,
   reciprocating the member in a linear horizontal direction at a predetermined, controlled frequency.
2. A method for inducing seismic shear waves in the earth for seismic surveying purposes comprised of the steps of:

coupling first and second members to the earth in close proximity;

reciprocally oscillating the first member linearly along a horizontal axis at a predetermined, varying frequency; and, rotatably oscillating the second member about a vertical axis at the same varying frequency.

3. A method for inducing seismic shear waves in the earth for seismic surveying purposes comprised of the steps of:

coupling first and second members to the earth in close proximity;

oscillating the first member linearly along a horizontal axis at a predetermined, varying frequency; and simultaneously rotatably oscillating the second member about a vertical axis at the same varying frequency but out-of-phase with the first member such that the shear waves generated by the second member will tend to cancel the shear waves generated by the first member in the more shallow geological strata to eliminate seismic noise interference.

4. A method for inducing seismic shear waves in the earth comprised of the steps of:

pressing a coupling member against the surface of the earth without substantial penetration of the earth and without interfering with the horizontal movement of the coupling member; and, reciprocally oscillating a reaction mass member in a horizontal plane relative to the coupling member by a motor interconnecting the two members.

5. A method for inducing seismic shear waves in the earth comprised of the steps of:

pressing a coupling member against the earth without interfering with movement in the horizontal plane; and, reciprocating a reaction mass member linearly along a horizontal axis relative to the coupling member by a reciprocating motor interconnecting the two members.

6. A method for seismic surveying comprising the steps of:

coupling a member to the surface of the earth at a first point;

reciprocating the member along a horizontal axis at a predetermined, controlled frequency to generate seismic shear waves having particle motion normal to the direction of propagation; and, detecting reflections of the seismic shear waves from subterranean interfaces at a second point remote from the first.

7. A method for seismic surveying comprising the steps of:

coupling first and second members to the earth in close proximity at a first point;

reciprocally oscillating the first member linearly along a horizontal axis at a predetermined, varying frequency;

rotatably oscillating the second member about a vertical axis at the same varying frequency; and detecting the seismic shear waves generated as a result of oscillation of the two members and reflected from subterranean interfaces at a second point remote from the first.

References Cited by the Examiner

UNITED STATES PATENTS

| | | | |
|---|---|---|---|
| 3,024,861 | 3/1962 | Clynch | 181—.5 |
| 3,034,594 | 5/1962 | Menzel et al. | 181—.5 |
| 3,159,233 | 12/1964 | Clynch et al. | 181—.5 |

BENJAMIN A. BORCHELT, *Primary Examiner.*

CHESTER L. JUSTUS, SAMUEL FEINBERG,
*Examiners.*

T. H. TUBBESING, G. H. GLANZMAN,
*Assistant Examiners.*